(12) United States Patent
Bryer et al.

(10) Patent No.: US 7,913,788 B1
(45) Date of Patent: Mar. 29, 2011

(54) INTEGRATED ENERGY STORAGE AND REAR SUSPENSION ASSEMBLY

(75) Inventors: Giles D. Bryer, Plymouth, MI (US); Steven P. Balgaard, Fenton, MI (US); Anne M. Stibich, Troy, MI (US); Benjamin K. Derocher, Milford, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 12/702,527

(22) Filed: Feb. 9, 2010

(51) Int. Cl.
*B60R 16/04* (2006.01)
(52) U.S. Cl. .................. 180/68.5; 180/69.1; 280/834
(58) Field of Classification Search .......... 180/54.1, 180/65.1, 65.22, 68.5, 69.1, 69.4; 280/834
See application file for complete search history.

(56) References Cited

U.S. PATENT DOCUMENTS

| | | | | |
|---|---|---|---|---|
| 4,593,786 A * | 6/1986 | Tate | ................ | 180/291 |
| 5,392,873 A * | 2/1995 | Masuyama et al. | ........... | 180/68.5 |
| 5,501,289 A * | 3/1996 | Nishikawa et al. | ........... | 180/68.5 |
| 5,516,599 A * | 5/1996 | Korall et al. | ................ | 429/48 |
| 5,518,272 A * | 5/1996 | Fukagawa et al. | ........... | 280/834 |
| 5,702,125 A * | 12/1997 | Nakajima et al. | ............ | 280/834 |
| 5,924,734 A * | 7/1999 | Fukagawa et al. | ........... | 280/830 |
| 5,948,298 A * | 9/1999 | Ijaz | ................ | 219/209 |
| 5,992,885 A * | 11/1999 | Fukagawa et al. | ........... | 280/830 |
| 5,997,040 A * | 12/1999 | Fukagawa et al. | ........... | 280/834 |
| 6,188,574 B1 * | 2/2001 | Anazawa | ................ | 361/695 |
| 6,227,322 B1 * | 5/2001 | Nishikawa | ................ | 180/68.5 |
| 6,598,691 B2 * | 7/2003 | Mita et al. | ................ | 180/65.1 |
| 6,672,620 B2 * | 1/2004 | Kawazu et al. | ............ | 280/834 |
| 6,824,168 B2 * | 11/2004 | Kawazu et al. | ............ | 280/834 |
| 6,953,099 B2 * | 10/2005 | Kawasaki et al. | ............ | 180/65.1 |
| 6,983,945 B2 * | 1/2006 | Kawasaki et al. | ............ | 280/834 |
| 7,004,274 B2 * | 2/2006 | Shibasawa et al. | ........... | 180/68.5 |
| 7,040,432 B2 * | 5/2006 | Kawasaki et al. | ............ | 180/65.1 |
| 7,051,825 B2 * | 5/2006 | Masui et al. | ............... | 180/68.5 |
| 7,063,355 B2 * | 6/2006 | Hashimura | ................ | 280/830 |
| 7,144,039 B2 * | 12/2006 | Kawasaki et al. | ............ | 280/784 |
| 7,264,277 B2 * | 9/2007 | Ono et al. | ................ | 280/830 |
| 7,331,611 B2 * | 2/2008 | Kusu et al. | ................ | 280/834 |
| 7,458,611 B2 * | 12/2008 | Hashimura | ................ | 280/830 |
| 7,484,766 B2 * | 2/2009 | Iwasaki | ................ | 280/833 |
| 7,503,585 B2 * | 3/2009 | Hashimura et al. | ........... | 280/782 |
| 7,533,748 B2 * | 5/2009 | Miyajima et al. | ............ | 180/68.5 |
| 7,556,110 B2 * | 7/2009 | Yamamoto et al. | ........ | 180/65.31 |
| 7,556,113 B2 * | 7/2009 | Amori et al. | ................. | 180/68.5 |
| 7,610,978 B2 * | 11/2009 | Takasaki et al. | ............ | 180/68.5 |
| 7,614,473 B2 * | 11/2009 | Ono et al. | ................ | 180/299 |
| 7,654,352 B2 * | 2/2010 | Takasaki et al. | ............ | 180/68.5 |
| 7,690,686 B2 * | 4/2010 | Hashimura et al. | ........... | 280/782 |
| 7,758,075 B2 * | 7/2010 | Isayama et al. | ............... | 280/834 |
| 7,770,679 B2 * | 8/2010 | Takaku et al. | ................ | 180/68.5 |
| 2003/0042057 A1 * | 3/2003 | Kawazu et al. | ............ | 180/69.4 |
| 2003/0089540 A1 * | 5/2003 | Koike et al. | ................. | 180/68.5 |
| 2003/0098191 A1 * | 5/2003 | Takedomi et al. | ........... | 180/68.5 |
| 2003/0189334 A1 * | 10/2003 | Kawasaki et al. | ............ | 280/834 |

(Continued)

*Primary Examiner* — J. Allen Shriver, II
*Assistant Examiner* — Brodie Follman

(57) ABSTRACT

An integrated aerodynamic energy storage and rear suspension assembly includes a rear fuel tank/suspension module, a battery support assembly and a structural joining plate. The rear fuel tank/suspension module includes a rear sandwich panel, a fuel tank assembly mounted on the rear sandwich panel, with the rear fuel tank/suspension module sliding into a rear body cavity. The battery support assembly includes a propulsion battery mounted on a front sandwich plate, with the front sandwich plate having an upper face sheet adjacent to the propulsion battery, a lower face sheet spaced from the upper face sheet and a core connecting the upper face sheet to the lower face sheet, and with the lower face sheet having a smooth lower surface.

17 Claims, 4 Drawing Sheets

U.S. PATENT DOCUMENTS

| | | | |
|---|---|---|---|
| 2004/0108677 A1* | 6/2004 | Sekiguchi | 280/124.109 |
| 2005/0161935 A1* | 7/2005 | Ono et al. | 280/834 |
| 2005/0173170 A1* | 8/2005 | Miyajima et al. | 180/68.5 |
| 2006/0197332 A1* | 9/2006 | Hashimura | 280/834 |
| 2006/0289224 A1* | 12/2006 | Ono et al. | 180/311 |
| 2007/0051549 A1* | 3/2007 | Fukuda | 180/232 |
| 2007/0137907 A1* | 6/2007 | Amori et al. | 180/65.1 |
| 2009/0120703 A1* | 5/2009 | Nagata | 180/68.5 |
| 2009/0145676 A1* | 6/2009 | Takasaki et al. | 180/65.1 |
| 2009/0152034 A1* | 6/2009 | Takasaki et al. | 180/68.5 |
| 2009/0236162 A1* | 9/2009 | Takasaki et al. | 180/68.5 |
| 2009/0242299 A1* | 10/2009 | Takasaki et al. | 180/68.5 |
| 2010/0071979 A1* | 3/2010 | Heichal et al. | 180/68.5 |
| 2010/0170735 A1* | 7/2010 | Nakamura et al. | 180/68.5 |
| 2010/0307848 A1* | 12/2010 | Hashimoto et al. | 180/68.5 |
| 2011/0000729 A1* | 1/2011 | Schwarz et al. | 180/68.5 |

* cited by examiner

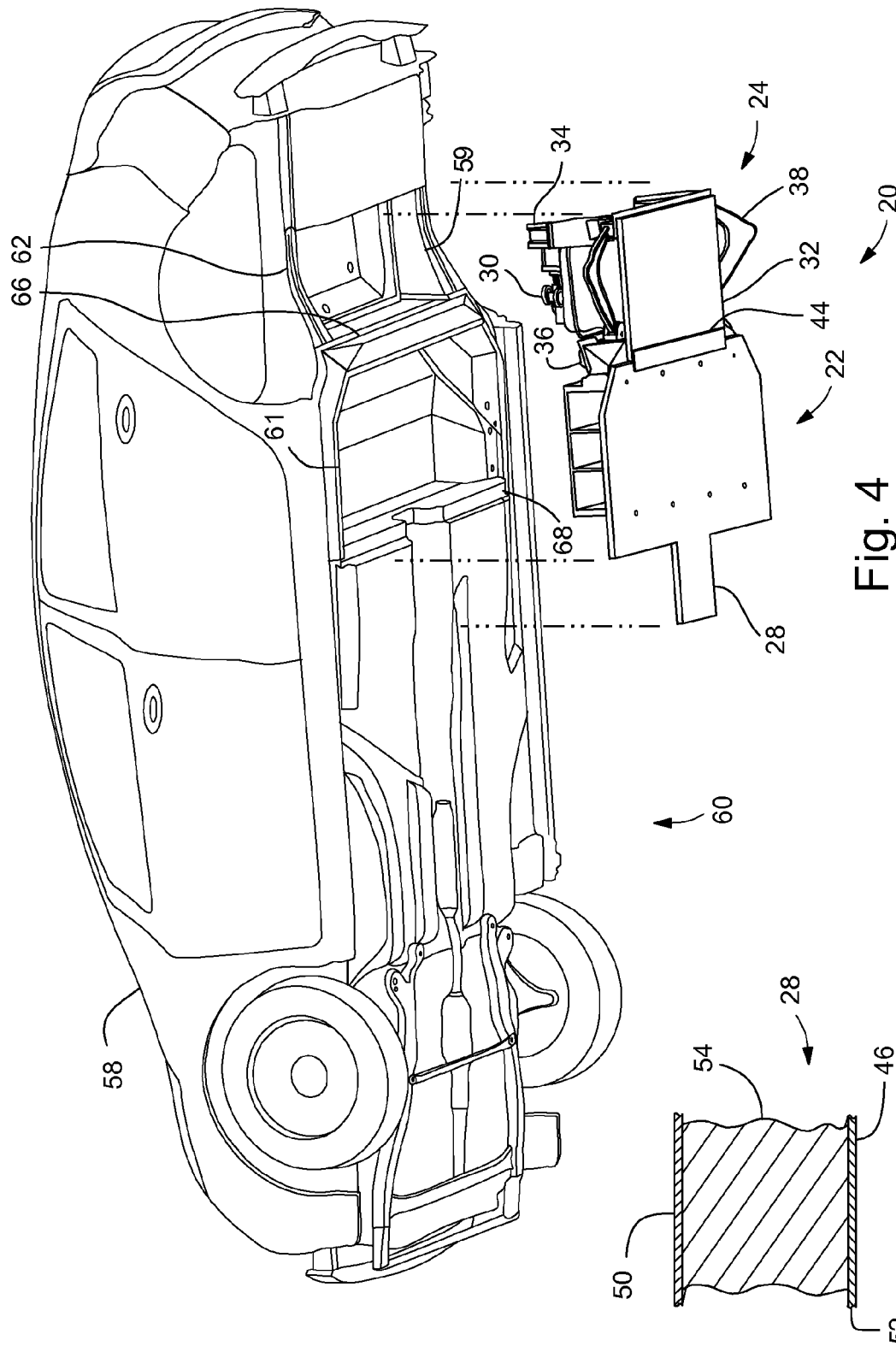

INTEGRATED ENERGY STORAGE AND REAR SUSPENSION ASSEMBLY

BACKGROUND OF INVENTION

The present invention relates generally to hybrid electric vehicles and more particularly to systems for mounting energy storage assemblies into the vehicle.

In order to increase overall fuel economy of automotive vehicles, some are being developed to operate as hybrid vehicles, that is vehicles that employ more than one source of energy to operate. A common type of hybrid vehicle is the hybrid electric vehicle that includes a propulsion motor and an internal combustion engine. For these vehicles, then, a need arises to store both a liquid fuel, such as gasoline or diesel fuel, and a battery pack. Thus, additional systems and assemblies must be packaged in the vehicle as compared to a conventional vehicle. Preferably, these systems are packaged in the vehicle in a compact, light weight, cost effective, and easy to assemble manner.

SUMMARY OF INVENTION

An embodiment contemplates an integrated energy storage and rear suspension assembly for use with a vehicle having a body including a rear body cavity and an adjacent forward body cavity, with the rear and forward body cavities located between a pair of frame rails. The assembly includes a rear fuel tank/suspension module, a battery support assembly and a structural joining plate. The rear fuel tank/suspension module includes a rear sandwich panel, a fuel tank assembly mounted on the rear sandwich panel, a rear cross member mounted on and extending laterally across a rear edge of the rear sandwich panel, a front cross member mounted on and extending laterally across a front edge of the rear sandwich panel, and a pair of lower control arms, each mounted to and extending from opposed ends of the rear cross member and the front cross member, with the rear fuel tank/suspension module sliding into the rear body cavity. The battery support assembly includes a propulsion battery mounted on a front sandwich plate, the front sandwich plate having an upper face sheet adjacent to the propulsion battery, a lower face sheet spaced from the upper face sheet and a core connecting the upper face sheet to the lower face sheet, with the lower face sheet having a smooth lower surface, and with the battery support assembly sliding into the forward body cavity. The structural joining plate connects to and secures a rear edge of the front sandwich panel to the front edge of the rear sandwich panel.

An advantage of an embodiment is that the integrated energy storage and rear suspension assembly has a relatively low mass for its structural support capabilities, and provides for efficient packaging of the energy storage assemblies into the vehicle body. Moreover, this assembly has efficient aerodynamic performance since it presents a smooth, flush surface with the underside of the vehicle body. In addition, this assembly is relatively easy to assemble to the vehicle and allows for ease of removal for servicing. The cored, sandwich material used for the front and rear sandwich panels contribute to providing these advantages in mounting and supporting the propulsion battery and fuel tank assembly, while also providing increased body stiffness. The sandwich panels may also provide additional protection during side and rear vehicle impacts. In addition, a portion of the rear suspension is supported by the integrated energy storage and rear suspension assembly, further improving overall packaging efficiency of this assembly in the vehicle body.

BRIEF DESCRIPTION OF DRAWINGS

FIG. 3 is a schematic, section view of a front sandwich panel.

FIG. 4 is a perspective view looking up at a portion of a vehicle, with the integrated energy storage and rear suspension assembly shown before assembly to the vehicle body.

DETAILED DESCRIPTION

Figure 1:
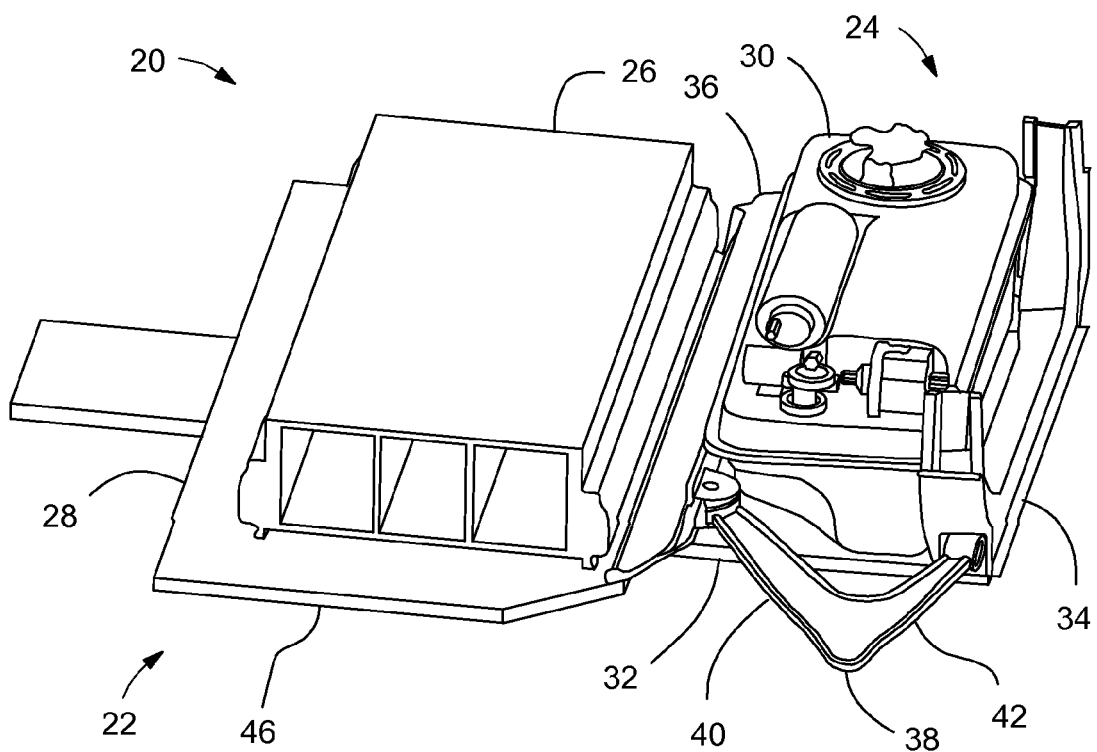
FIG. 1 is a perspective view looking down on an integrated energy storage and rear suspension assembly.
Figure 2:
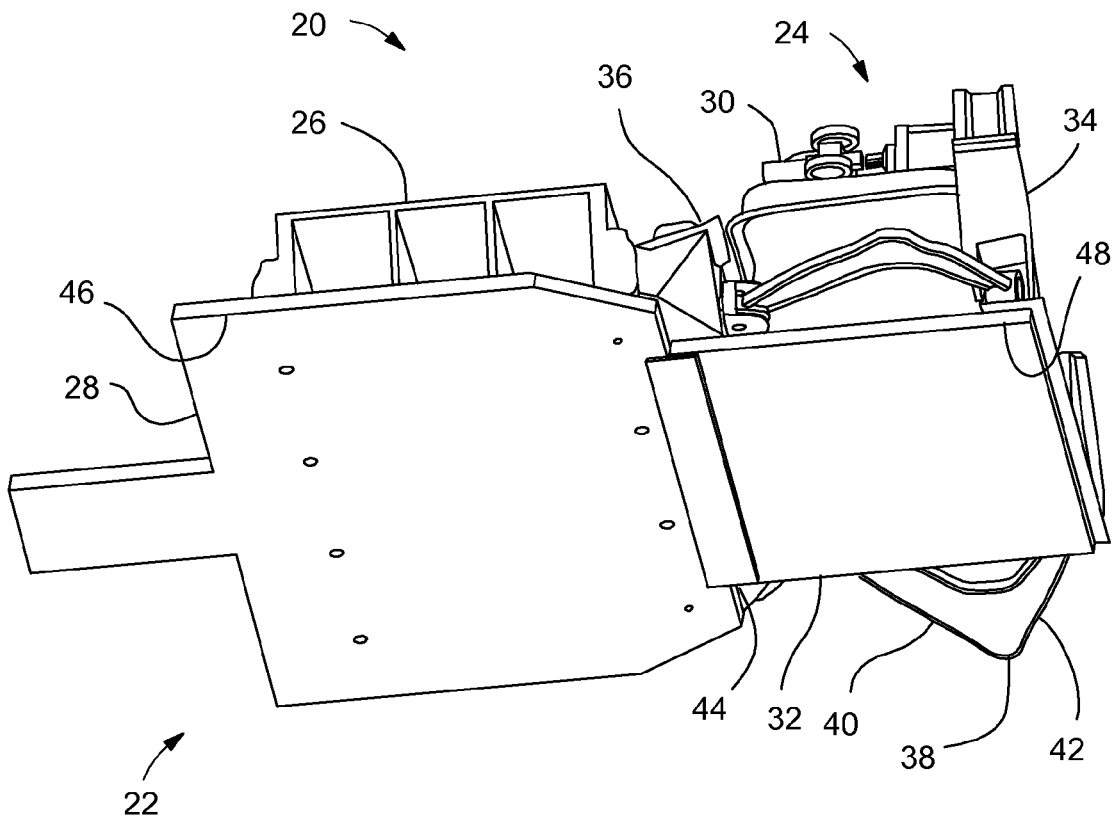
FIG. 2 is a perspective view looking up at the assembly of FIG. 1.

Referring to FIGS. 1-2, an integrated energy storage and rear suspension assembly, indicated generally at 20, is shown. The assembly 20 includes a battery support assembly 22 and a rear fuel tank/suspension module 24. The battery support assembly 22 includes a propulsion battery pack 26 (a portion of which is shown), which is mounted on a front sandwich panel 28. The battery pack 26 stores energy for driving an electric motor (not shown).

The rear fuel tank/support module 24 includes a fuel tank assembly 30 that is mounted on a rear sandwich panel 32. A rear cross member 34 is also mounted to the rear sandwich panel 32 just behind the fuel tank assembly 30 and extends across the width of the panel 32. A front cross member 36 mounts to the rear sandwich panel 32 between the fuel tank assembly 30 and the propulsion battery pack 26 and also extends across the width of the panel 32. A pair of lower control arms 38 extend laterally outward from the rear and front cross members 34, 36. Each lower control arm 38 includes a front flange 40 that flexibly mounts to the front cross member 36 and a rear flange 42 that flexibly mounts to the rear cross member 34. The lower control arms 38 are part of the rear suspension of the vehicle.

A structural joining plate 44 connects between a bottom face 46 of the front sandwich panel 28 and a bottom face 48 of the rear sandwich panel 32. The joining plate 44 secures and structurally holds the two panels together. The bottom of the joining plate 44, as well as the bottom faces 46, 48 of the panels 28, 32, are preferably flat and smooth to reduce aerodynamic drag on the vehicle.

FIG. 3 illustrates a cross section through a portion of the front sandwich panel 28. The construction of the rear sandwich panel 32 can be essentially the same as the front and so will not be shown in more detail. The front sandwich panel 28 includes an upper face sheet 50, which may be made of steel or other high strength material, a lower face sheet 52, which may be made of steel or other high strength material, and a core 54 connecting the upper face sheet 50 to the lower face sheet 52. The core 54 preferably has a low density in order to minimize the weight and may be, for example, a foam core, a urethane mid-density foam, a Kevlar honeycomb, an aluminum honeycomb or balsa wood. This arrangement of the higher strength upper and lower face sheets 50, 52 with a light weight core provides a high strength to weight ratio, a compact support structure, smooth bottom face 46 for good aerodynamic properties, and allows the structure to handle bending, shear and torsion loads introduced into the energy storage and rear suspension assembly 20. The energy storage systems are supported in vertical bending, side and rear impact loads are accounted for, rear suspension loads are supported, and global body loads are accounted for while minimizing the overall mass.

Figure 5:
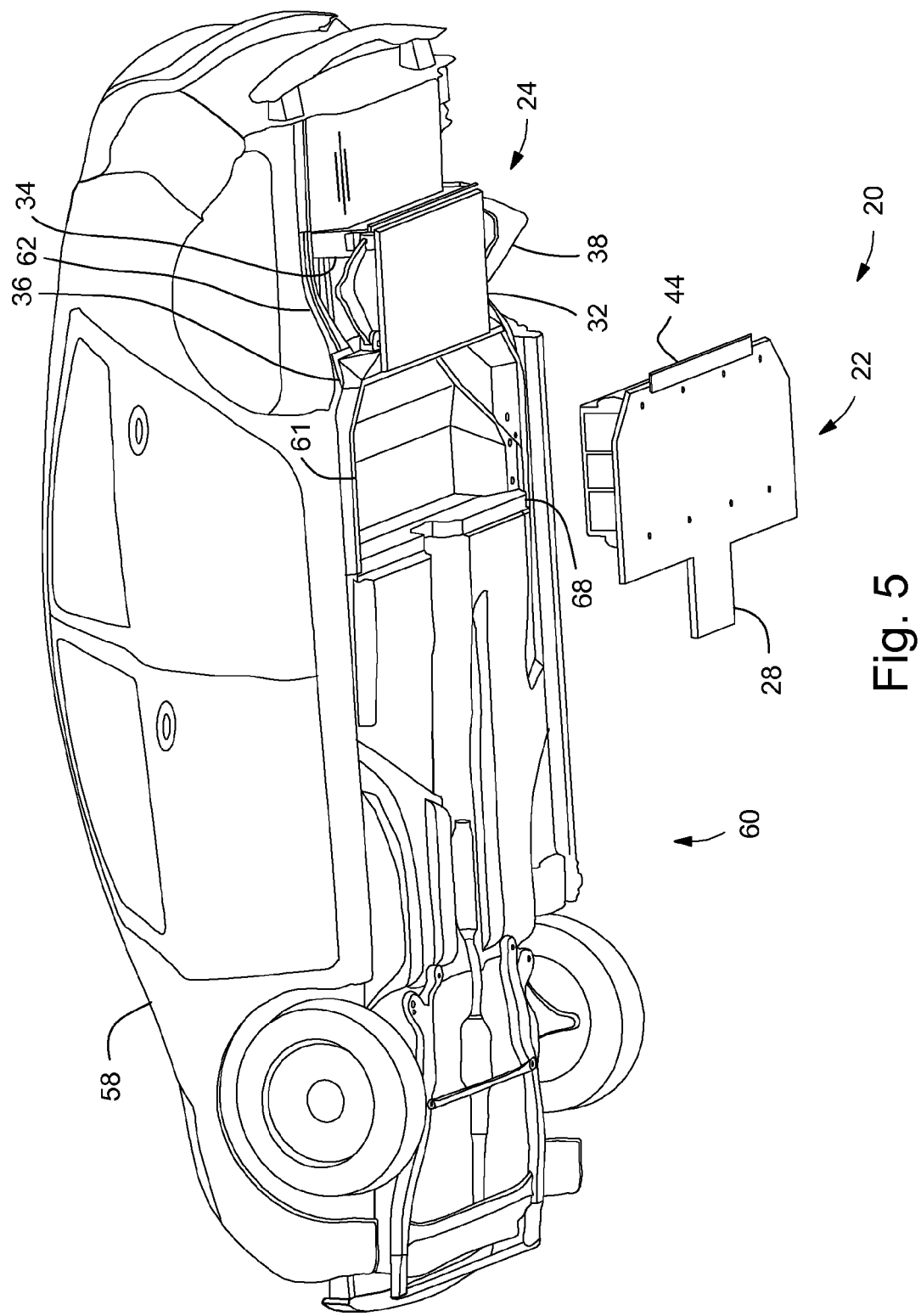
FIG. 5 is a perspective view similar to FIG. 4, but illustrating the rear fuel tank/suspension module mounted to the vehicle body and the battery/support assembly ready for assembly.
Figure 6:
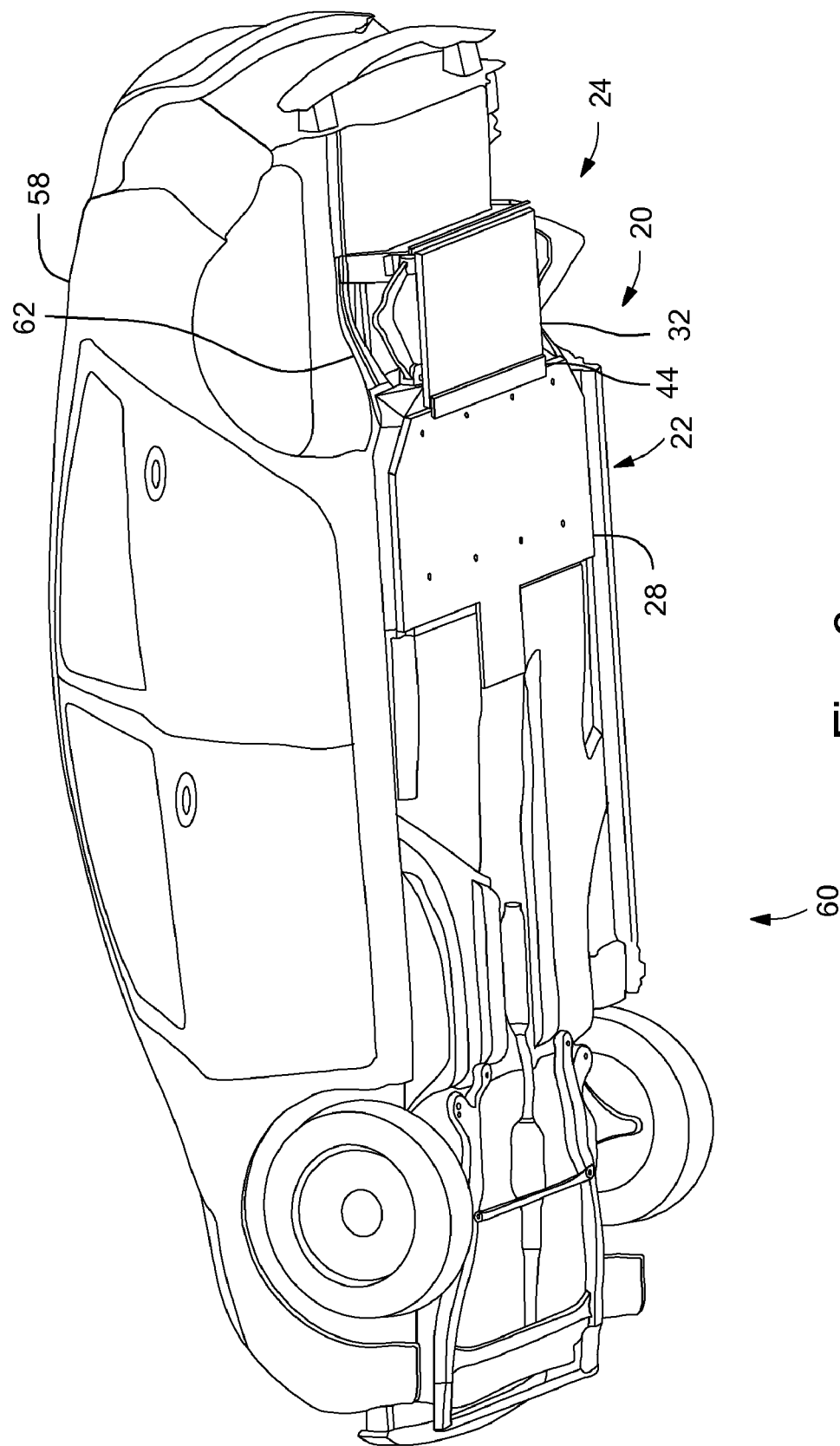
FIG. 6 is a perspective view similar to FIG. 4, but illustrating the integrated energy storage and rear suspension assembly assembled to the vehicle body.

FIGS. 4-6 illustrate a portion of the assembly process for installing the integrated energy storage and rear suspension assembly 20 into a body 58 of a vehicle 60. The body includes a rear cavity 59 sized to receive the fuel tank/suspension module 24 and a forward cavity 61 sized to receive the battery support assembly 22. In FIG. 4, the battery support assembly 22 and the fuel tank/suspension module 24 are each assembled. While the two are shown together in FIG. 4, that is just for illustrative purposes.

The fuel tank/rear suspension module 24 is lifted into the body 58 from below, as is shown in FIG. 5. The front cross member 36 and the rear cross member 34 are secured to the body 58, which may include securing them to a pair of longitudinally extending frame rails 62 and laterally extending suspension cross member 66 (the cross member 66 visible in FIG. 4). The fuel tank assembly 30 as well as the lower control arms are now securely affixed to the vehicle 60.

Then, the battery support assembly 22 is lifted into the body 58 from below, as shown in FIG. 6. The front sandwich panel 28 may be secured to the frame rails 62, a laterally extending forward cross-car structural member 68 and the suspension cross member 66 (the members 66, 68 visible in FIG. 4). The front sandwich panel 28 may be mounted to the body 58 using, for example, bolts and removable sealer/adhesive. This will seal the propulsion battery pack from the elements, while still allowing it to be removed for service. The structural joining plate 44 is then mounted to the front and rear composite panels 28, 32 at the suspension cross member 66 to secure the two panels 28, 32 together.

While certain embodiments of the present invention have been described in detail, those familiar with the art to which this invention relates will recognize various alternative designs and embodiments for practicing the invention as defined by the following claims.

What is claimed is:

1. An integrated energy storage and rear suspension assembly for use with a vehicle having a body including a rear body cavity and an adjacent forward body cavity, the rear and forward body cavities located between a pair of frame rails, the assembly comprising:
    a rear fuel tank/suspension module including a rear sandwich panel, a fuel tank assembly mounted on the rear sandwich panel, a rear cross member mounted on and extending laterally across a rear edge of the rear sandwich panel, a front cross member mounted on and extending laterally across a front edge of the rear sandwich panel, and a pair of lower control arms, each mounted to and extending from opposed ends of the rear cross member and the front cross member, the rear fuel tank/suspension module configured to slide into the rear body cavity;
    a battery support assembly including a propulsion battery mounted on a front sandwich plate, the front sandwich plate having an upper face sheet adjacent to the propulsion battery, a lower face sheet spaced from the upper face sheet and a core connecting the upper face sheet to the lower face sheet, the lower face sheet having a smooth lower surface, and the battery support assembly being configured to slide into the forward body cavity; and
    a structural joining plate connected to and securing a rear edge of the front sandwich panel to the front edge of the rear sandwich panel.

2. The assembly of claim 1 wherein the front sandwich plate is configured to be removably and sealingly secured to the frame rails.

3. The assembly of claim 1 wherein the upper face sheet and the lower face sheet are made of steel.

4. The assembly of claim 1 wherein the core is made of a urethane foam.

5. The assembly of claim 1 wherein the core is made of Kevlar having a honeycomb shape.

6. The assembly of claim 1 wherein the core is made of aluminum having a honeycomb shape.

7. The assembly of claim 1 wherein the core is made of balsa wood.

8. A vehicle comprising:
    a body having a pair of longitudinally extending frame rails, a laterally extending suspension cross member extending between the two frame rails, and a laterally extending forward cross member extending between the two frame rails, the frame rails and the suspension cross member defining a portion of a rear body cavity in the body, and the frame rails, the suspension cross member and the forward cross member defining a portion of a forward body cavity in the body;
    an integrated energy storage and rear suspension assembly including a rear fuel tank/suspension module, a battery support assembly and a structural joining plate; the rear fuel tank/suspension module including a rear sandwich panel, a fuel tank assembly mounted on the rear sandwich panel, a rear cross member mounted on and extending laterally across a rear edge of the rear sandwich panel, a front cross member mounted on and extending laterally across a front edge of the rear sandwich panel, and a pair of lower control arms, each mounted to and extending from opposed ends of the rear cross member and the front cross member, the rear fuel tank/suspension module mounted in the rear body cavity; the battery support assembly including a propulsion battery mounted on a front sandwich plate, the front sandwich plate having an upper face sheet adjacent to the propulsion battery, a lower face sheet spaced from the upper face sheet and a core connecting the upper face sheet to the lower face sheet, the lower face sheet having a smooth lower surface, the battery support assembly mounted in the forward body cavity; and the structural joining plate connected to and securing a rear edge of the front sandwich panel to the front edge of the rear sandwich panel.

9. The vehicle of claim 8 wherein the front sandwich plate is removably and sealingly secured to the frame rails.

10. The vehicle of claim 8 wherein the upper face sheet and the lower face sheet are made of steel.

11. The vehicle of claim 8 wherein the core is made of a urethane foam.

12. The vehicle of claim 8 wherein the core is made of Kevlar having a honeycomb shape.

13. The vehicle of claim 8 wherein the core is made of aluminum having a honeycomb shape.

14. The vehicle of claim 8 wherein the core is made of balsa wood.

15. The vehicle of claim 8 wherein the front sandwich panel is removably and sealingly secured to the frame rails, the suspension cross member and the forward cross member.

16. The vehicle of claim 8 wherein the rear cross member is mounted to the frame rails.

17. The vehicle of claim 16 wherein the front cross member and the structural joining plate are mounted to the suspension cross member.

* * * * *